United States Patent
Hay

(10) Patent No.: US 7,056,163 B2
(45) Date of Patent: Jun. 6, 2006

(54) NEUTRAL BAR WITH SLIDE-ON SADDLE LUG

(75) Inventor: Thomas A. Hay, Cincinnati, OH (US)

(73) Assignee: Connector Manufacturing Company, Hamilton, OH (US)

( * ) Notice: Subject to any disclaimer, the term of this patent is extended or adjusted under 35 U.S.C. 154(b) by 0 days.

(21) Appl. No.: 10/944,159

(22) Filed: Sep. 20, 2004

(65) Prior Publication Data

US 2006/0063437 A1    Mar. 23, 2006

(51) Int. Cl.
*H01R 4/36* (2006.01)
(52) U.S. Cl. ..................................... 439/810
(58) Field of Classification Search ............... 439/793, 439/810, 814
See application file for complete search history.

(56) References Cited

U.S. PATENT DOCUMENTS

| | | | | |
|---|---|---|---|---|
| 3,551,876 A | * | 12/1970 | Walter | 439/110 |
| 3,727,171 A | * | 4/1973 | Coles et al. | 439/110 |
| 4,231,633 A | * | 11/1980 | Luke et al. | 439/723 |
| 4,603,376 A | * | 7/1986 | Maier | 361/824 |
| 4,809,132 A | * | 2/1989 | Palmieri et al. | 361/634 |
| 4,946,405 A | | 8/1990 | Boehm | |
| 5,269,710 A | * | 12/1993 | Donnerstag | 439/810 |
| 5,957,733 A | * | 9/1999 | Mello et al. | 439/814 |
| 6,338,658 B1 | * | 1/2002 | Sweeney | 439/810 |

* cited by examiner

*Primary Examiner*—Tho D. Ta
(74) *Attorney, Agent, or Firm*—Kremblas, Foster, Phillips & Pollick

(57) ABSTRACT

A neutral bar assembly for providing an electrical connection for a wire to a neutral bar, with the neutral bar assembly having a neutral bar and a neutral bar saddle assembly. The neutral bar has a first end, a second end, an upper portion having a top surface, a lower portion having a bottom surface, and an intermediate portion located between the upper and lower portions. The intermediate portion has a sidewall and the upper portion has a top flange that has a sidewall, a lower edge, and a sloping surface portion extending between the lower edge and the intermediate portion sidewall. The neutral bar saddle assembly includes a collar and a wire binding screw, with the collar having a top surface with an aperture formed therein, a sidewall having at least one aperture formed therein, a pair of spaced apart lower interior sidewalls, and two collar flange members separated from one another by the neutral bar. Each collar flange member has an interior sidewall, a top edge, and a sloping sidewall surface extending between the top edge and the lower interior sidewall.

15 Claims, 1 Drawing Sheet

NEUTRAL BAR WITH SLIDE-ON SADDLE LUG

BACKGROUND OF THE INVENTION

1. Field of the Invention

This invention relates generally to an improved electrical terminal connector, and more particularly, to a neutral bar with a slide-on saddle lug.

2. Description of the Related Art

This invention is directed to the providing of a neutral bar assembly that incorporates a slide-on saddle lug. A typical prior art neutral bar assembly includes a separate neutral bar, a collar in the form of a box lug, a mounting screw, and a lug screw.

The typical prior art collar, also known as a box lug, is generally cube-shaped, and features a directional aperture that typically extends only transversely through the collar along the axis which upon assembly is parallel to the longitudinal axis of the neutral bar. The collar also features a wire binding screw aperture that extends through the top of the collar and terminates at the channel formed by the passage of the directional aperture therethrough. The other two exterior sidewalls of the box lug are completely planar and void of apertures.

One side only of the collar features a flange that causes that one sidewall to extend further downwardly, such that when the neutral bar assembly is assembled by the end user, the flange rests alongside one of the top edges of the neutral bar to which it will be attached. The bottom of the collar features a mounting screw aperture formed therein, which aperture extends completely through the bottom portion of the collar.

Until now, the four various components of the neutral bar assembly have been assembled prior to sale in the electrical connector industry to the end user. At the time of assembly, the collar is positioned atop the neutral bar with the flange portion directly adjacent the top surface of the neutral bar. The bottom surface of the collar rests atop the top surface of the neutral bar. Next, an air driver is used to secure the collar to the neutral bar utilizing the mounting screw. Then the air driver is withdrawn from the wire binding screw aperture, also referred to as a lug screw aperture, and the wire binding screw, also referred to as a lug screw, is secured to the upper surface of the collar to complete the assembly.

As such, it may readily be appreciated that assembly of the prior art device requires a number of steps, all of which consume time and worker energy. Once assembled, in actual use the main conductor (i.e. wire) must be inserted into the prior art assembly via the one open directional hole at the end of the neutral bar. Furthermore, once inserted, the wire partially lies on both the mounting screw and potentially also on a portion of the interior sidewalls of the collar. Any such contact creates a current dam, a condition which from an electrical engineering standpoint is undesirable since it adversely affects current flow.

It is thus apparent that the need exists for a neutral bar and collar assembly that is quicker and easier to use, that can more readily accommodate the main conductor, and that does not create a current dam.

SUMMARY OF THE INVENTION

In accordance with the present invention, there is disclosed a neutral bar assembly for use in facilitating electrical connections, with the neutral bar assembly including a neutral bar and a neutral bar saddle assembly. The neutral bar has a first end, a second end, an upper portion having a top surface, a lower portion having a bottom surface, and an intermediate portion located between the upper and lower portions. The intermediate portion has a sidewall, and the upper portion has a top flange that has a sidewall, a lower edge, and a sloping surface portion extending between the lower edge and the intermediate portion sidewall.

The neutral bar saddle assembly includes a collar and a wire binding screw, with the collar having a top surface with an aperture formed therein, a sidewall having at least one aperture formed therein, a pair of spaced apart lower interior sidewalls, and two collar flange members separated from one another by the neutral bar. Each collar flange member has an interior sidewall, a top edge, and a sloping sidewall surface extending between the top edge and the lower interior sidewall.

The top flange has a sloping surface portion which extends between the lower edge and the sidewall of the intermediate portion. In the preferred embodiment of the invention, the sloping surface portion extends upwardly from the lower edge to the sidewall of the intermediate portion. Additionally, the neutral bar has an elongated central axis, with the collar having at least one other aperture formed in the collar sidewall perpendicular to the elongated central axis of the neutral bar. In the preferred embodiment of the invention, the collar has at least four apertures formed therein.

The collar has a pair of spaced apart lower interior sidewalls, with one lower interior sidewall located directly adjacent each collar flange member, and wherein each collar flange member has a sloping sidewall surface extending between the top edge and the lower interior sidewall of the collar flange member. Preferably, the sloping sidewall surface portion extends downwardly from the top edge to the lower interior sidewall. Each of the top flange sidewalls are spaced apart a first distance, and each of the collar interior flange interior sidewalls are spaced apart a second distance, with the first distance being greater than the second distance. The collar also has a bottom surface and in the preferred embodiment of the invention, the four apertures in the collar sidewalls include two that are open at the bottom surface.

There is also disclosed a method of securing a neutral bar to a neutral saddle assembly comprising the steps of sliding the collar of a neutral saddle assembly onto the end of a neutral bar, inserting a wire through an aperture in the sidewall of the collar with the terminal portion of the wire resting directly on the neutral bar, tightening the wire binding screw in the collar, with the tightening causing the wire to be secured between the neutral bar and the wire binding screw, and with the tightening also causing the neutral bar to be brought into clamping contact with the collar.

In the method of the invention, the neutral bar has a first end and collar has a first and a second sidewall, with each of the first and second sidewalls having an aperture formed therein and each of the first and second sidewalls having an exterior surface, such that the collar is slid over the first end of neutral bar. The neutral bar passes first through the collar second sidewall aperture. The first end of the neutral bar has a first end wall, such that the collar is slid over the neutral bar until the first end wall is in the same plane as the exterior surface of the first sidewall of the collar.

The primary objective of this invention is to provide a neutral bar assembly that is easier to use than existing neutral bar assemblies.

Another objective of this invention is to provide a neutral bar assembly that permits the establishment of an electrical connection quicker than with existing neutral bar assemblies.

Still another objective of this invention is to provide a neutral bar assembly that permits the establishment of an electrical connection that does not create a current dam.

Other objects and advantages of the invention will be apparent from the following description, the accompanying drawings and the appended claims.

Figure 1:
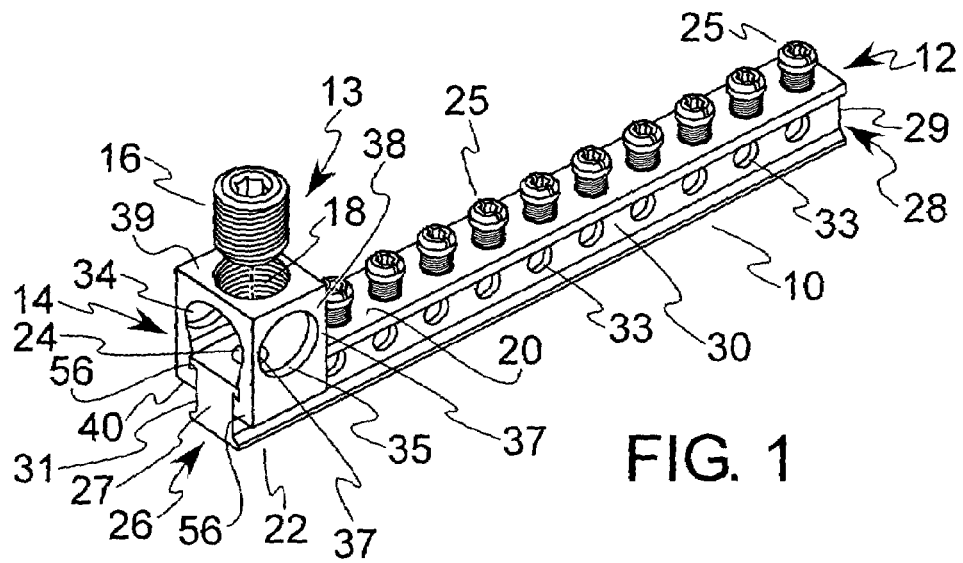
FIG. 1 is a perspective view of a neutral bar assembly made in accordance with the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

Having reference to the drawings, attention is directed first to FIG. 1, which discloses a neutral bar assembly made in accordance with the invention designated generally by the numeral 10 can be appreciated as being generally comprised of a neutral bar 12 and a neutral bar saddle assembly 13. The neutral bar saddle assembly comprises a saddle lug or collar 14 and a wire binding screw 16. The wire binding screw is of the type well known in the art, and in the preferred embodiment of the invention associated with a smaller saddle lug is a 7/16–20×0.50" long aluminum screw with a 0.189" hex formed at the center of the top surface thereof to facilitate tightening, however a slot to accommodate a screwdriver may also be fabricated at the center of the top surface as another way to facilitate tightening. In an embodiment of the invention that features a larger saddle lug the wire binding screw is a 5/8–18×0.75" long aluminum screw with a 0.314" hex formed at the center of the top surface thereof to facilitate tightening. The wire binding screw is secured to the collar 14 at the wire binding screw aperture 18, an aperture which is also well known in the art.

Figure 3:
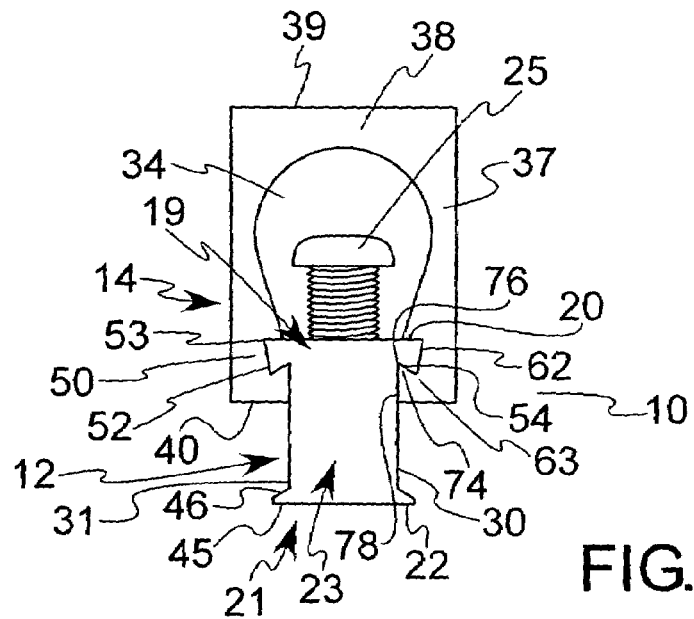
FIG. 3 is a front elevational view.

Turning now to the structure of the neutral bar 12 associated with this invention, it can be appreciated from a comparison of FIGS. 1 and 3 that the neutral bar has an upper portion 19 having a top surface 20, a lower portion 21 having a bottom surface 22, and an intermediate portion 23 that has its opposite ends connected to the upper and lower portions 19 and 21 respectively of the neutral bar 12. In cross-section, the neutral bar can be appreciated as having a generally I-shape.

The neutral bar is elongated with a length that can vary depending on the specifics of the installation site, which specifics are related to the particular job application. In the embodiment whose measurements have been provided above that length is approximately 4", with the bar being preferably formed by the extrusion of a conductive metal, but it should be understood that all of the relative dimensions referenced herein merely conform to but a couple of specific embodiments of the invention, and that the dimensions could vary since they are not what constitute the invention disclosed herein. The bar has a plurality of neutral bar apertures 24 formed in its top surface 21. Most of those have conventional wire connecting means 25 of the type found in existing neutral bars. In the preferred embodiment of the invention, these are 1/4–28×0.39" long combination slot/square drive steel screws, but of course the size of screw could vary.

Figure 2:
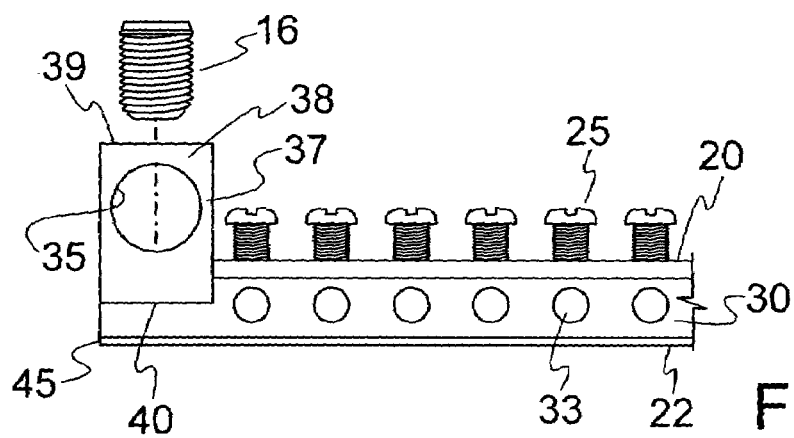
FIG. 2 is a side elevational view taken from the right side of FIG. 1.

The neutral bar has a first end 26 with a first end wall 27 and a second end 28 with a second end wall 29. The neutral bar also has a pair of sidewalls 30 and 31 on opposite sides of the neutral bar 12 as can be appreciated from a comparison of FIGS. 1–3. These sidewalls 30, 31 are substantially planar, however they also feature a plurality of wire connecting apertures 33 where smaller wires are secured to the neutral bar in a manner well known in the art. Smaller wires are inserted into the wire connecting apertures 33 and held in clamping engagement to the neutral bar by tightening the appropriate wire connecting screw 25. These smaller wires can be inserted from either side of the neutral bar 12 into the apertures which in the preferred embodiment of the invention are 1/4" in diameter.

Turning now to the structure of the saddle lug 14, it has at least one and preferably two directional apertures 34 formed in opposite sides of the collar 14. A first side of the collar is closest to the first end wall 27 of the neutral bar 12. The second side of the collar is closer to the second end 28 of the neutral bar. In the preferred embodiment of the invention there are also cross apertures 35 formed in the collar in sidewalls roughly perpendicular to the axis between the directional apertures, with the axis between the directional apertures being parallel to the longitudinal axis of the neutral bar. The directional apertures are directly across from each other, just as the cross apertures are directly across from each other.

Between each directional aperture and the cross aperture adjacent to it is a corner post 37. These four corner posts are integral with the collar sidewall 38. The collar 14 also has a collar top surface 39 and a collar bottom surface 40 which in the preferred embodiment of the invention can be appreciated as being parallel to each other.

In the smaller sized collar, its height is 0.910", the two sidewall portions that have directional apertures are 0.660" wide, and the two sidewall portions that have cross apertures are 0.665" wide, with the cross apertures being 0.470" in diameter. The distance from the bottom surface of the neutral bar to the top surface of the collar is 1.131". In the larger sized collar, its height is 1.120", the two sidewall portions that have directional apertures are 0.880" wide, and the two sidewall portions that have cross apertures are 0.928" wide. The distance from the bottom surface of the neutral bar to the top surface of the collar is 1.357".

The lower portion 21 of the neutral bar shown in the drawing figures preferably has a bottom flange 45 having a slightly beveled surface 46 on the top of each bottom flange. Each bottom flange 45 extends outward from the intermediate portion of the neutral bar approximately 0.071". It should be realized however that the specific structure of the lower portion of the neutral bar can vary depending on the specific neutral bar supplier used.

The upper portion 19 of the neutral bar preferably has a top flange 50 having a top flange side wall 52 directly adjacent the top surface 20 of the neutral bar. The top flange sidewall has as its bottom a top flange sidewall lower edge 53. Intermediate the top flange sidewall lower edge 53 and the intermediate portion 23 of the neutral bar is a top flange tapered surface 54. The top flange tapered surface is sloped or inclined upwardly from the top flange sidewall lower edge to the sidewall of the intermediate portion. Each top flange 50 also extends outward from the intermediate portion of the neutral bar approximately 0.071".

Returning now to the collar 14, it has a pair of collar interior flanges 56, which may also be referred to as collar flange members. Each collar interior flange 56 has a collar lower interior sidewall 62, such that these pair of lower interior sidewall are spaced apart with one lower interior sidewall located directly adjacent each collar flange member. Each collar lower interior sidewall 62 has a collar lower interior sidewall lower edge 63 and top edge 76 as shown in FIG. 3. A collar interior flange tapered or sloped surface 74 extends between the collar interior flange top edge 76 and the collar lower interior sidewall 62, with the sloping sidewall surface portion 74 extending downwardly from the top edge 76 to the lower interior sidewall 62.

As can best be appreciated from a comparison of FIGS. 1 and 3, each of the top flange sidewalls 52 are spaced apart or separated by a first distance and each of the collar interior flange interior sidewalls 78 are spaced apart a second distance with the first distance being greater than the second distance. For example, in the embodiments of the invention discussed above, where the top flange sidewalls of the neutral bar are separated by approximately 0.392", the collar interior flange interior sidewalls of the collar are spaced apart a distance of approximately 0.260".

In actual use, the neutral bar is secured to the neutral saddle assembly by first sliding the collar of the neutral saddle assembly onto the end of the neutral bar. The main wire is then inserted through an aperture in the sidewall of the collar, with the terminal portion of the wire resting directly on the neutral bar. Next, the wire binding screw is tightened in the collar, resulting in the wire being clampingly secured between the neutral bar and the wire binding screw. Additionally, the tightening causes the neutral bar to be brought into clamping contact with the collar. An additional benefit of the dovetail structure of this invention is that it keeps the legs of the collar from spreading when the neutral lug is torqued down.

In the practicing of the method associated with the invention, the neutral bar has a first end and the collar has a first and a second sidewall, with each of the first and second sidewalls of the collar having an aperture formed therein and with each of the first and second sidewalls having an exterior surface, such that the collar is slid over the first end of neutral bar. However it should be understood that the neutral bar passes first through the collar second sidewall aperture. The first end of the neutral bar has a first end wall, such that preferably the collar is slid over the neutral bar until the first end wall of the neutral bar is in the same plane as the exterior surface of the first sidewall of the collar.

The neutral bar with slide-on saddle lug disclosed by this invention eliminates the cost of mounting hardware, specifically the mounting screw, to fixedly secure the collar to the neutral bar. This enables the entire neutral bar assembly to be supplied to end users thereby saving them time and labor. Consequently, this invention reduces the number of internal parts as well as inventory for neutral bar and collar assemblies. The new cross apertures permit a conductor to be inserted from any direction. Finally, the main neutral feed terminates directly on the neutral bar, thus eliminating the joint between the collar and the neutral bar, with the benefit of minimizing resistance and eliminating the current dam associated with prior art neutral bar assemblies thereby contributing to better current flow.

While the form of apparatus and method herein described both constitute a preferred embodiment of the present invention, it is to be understood that the invention is not limited to this precise form of apparatus and method and that changes may be made therein without departing from the scope of the invention which is defined in the appended claims.

What is claimed is:

1. A neutral bar assembly for providing an electrical connection for a wire to a neutral bar, said neutral bar assembly comprising, a neutral bar having a first end, a second end, an upper portion having a top surface, a lower portion having a bottom surface, and an intermediate portion located between said upper and lower portions, said upper portion having a top flange, said top flange having a sidewall and a lower edge, said intermediate portion having a sidewall, said top flange having a sloping surface portion extending between said lower edge and said sidewall of said intermediate portion, said sloping surface portion extending upwardly from said lower edge to said sidewall of said intermediate portion, and a neutral bar saddle assembly, said neutral bar saddle assembly comprising a collar and a wire binding screw, said collar having a top surface with an aperture formed therein, a sidewall having at least one aperture formed therein, and two collar flange members separated from one another by said neutral bar, each collar flange member having an interior sidewall and a top edge.

2. The assembly according to claim 1 wherein said neutral bar has an elongated central axis, and said collar has at least one other aperture formed in said collar sidewall perpendicular to said elongated central axis of said neutral bar.

3. The assembly according to claim 1 wherein each of said top flange sidewalls are spaced apart a first distance, and wherein each of said collar interior flange interior sidewalls are spaced apart a second distance with said first distance being greater than said second distance.

4. The assembly according to claim 1 wherein said collar has at least four apertures formed therein.

5. The assembly according to claim 4 wherein said collar has a bottom surface, and said four apertures in said collar sidewalls include two that are open at said bottom surface.

6. The assembly according to claim 1 wherein said top flange has a pair of sloping surface portions, one sloping surface portion extending between each lower edge of said top flange and said sidewall of said intermediate portion, and said collar has a pair of spaced apart lower interior sidewalls, with one lower interior sidewall located directly adjacent each collar flange member, and wherein each said collar flange member has a sloping sidewall surface extending between said top edge and said lower interior sidewall.

7. The assembly according to claim 6 wherein each of said top flange sidewalls are spaced apart a first distance, and wherein each of said collar interior flange interior sidewalls are spaced apart a second distance with said first distance being greater than said second distance.

8. A neutral bar assembly for providing an electrical connection for a wire to a neutral bar, said neutral bar assembly comprising, a neutral bar having a first end, a second end, an upper portion having a top surface, a lower portion having a bottom surface, and an intermediate portion located between said upper and lower portions, said upper portion having a top flange, said top flange having a sidewall and a lower edge, said intermediate portion having a sidewall, and a neutral bar saddle assembly, said neutral bar saddle assembly comprising a collar and a wire binding screw, said collar having a top surface with an aperture formed therein, a sidewall having at least one aperture formed therein, and two collar flange members separated from one another by said neutral bar, each collar flange member having an interior sidewall and a top edge, said collar having a pair of spaced apart lower interior sidewalls, with one lower interior sidewall located directly adjacent each collar flange member, and wherein each said collar flange member has a sloping sidewall surface extending between said top edge and said lower interior sidewall.

9. The assembly according to claim 8 wherein said sloping sidewall surface portion extends downwardly from said top edge to said lower interior sidewall.

10. The assembly according to claim 8 wherein said neutral bar has an elongated central axis, and said collar has at least one other aperture formed in said collar sidewall perpendicular to said elongated central axis of said neutral bar.

11. The assembly according to claim 8 wherein each of said top flange sidewalls are spaced apart a first distance, and wherein each of said collar interior flange interior sidewalls are spaced apart a second distance with said first distance being greater than said second distance.

12. The assembly according to claim 8 wherein said collar has at least four apertures formed therein.

13. The assembly according to claim 8 wherein said collar has a bottom surface, and said four apertures in said collar sidewalls include two that are open at said bottom surface.

14. A method of securing a neutral bar to a neutral saddle assembly comprising the steps of sliding the collar of a neutral saddle assembly onto the end of a neutral bar, inserting a wire through an aperture in the sidewall of said collar with the terminal portion of said wire resting directly on said neutral bar, tightening the wire binding screw in the collar, said tightening causing the wire to be secured between said neutral bar and said wire binding screw, said tightening also causing said neutral bar to be brought into clamping contact with said collar.

15. The method according to claim 14 wherein said neutral bar has a first end and said collar has a first and a second sidewall, each of said first and second sidewall having an aperture formed therein and each of said first and second sidewall having an exterior surface, said collar being slid over said first end of said neutral bar, said neutral bar passing first through said collar second sidewall aperture, said first end of said neutral bar having a first end wall, said collar being slid over said neutral bar until said first end wall is in the same plane as the exterior surface of said first sidewall of said collar.

* * * * *